(No Model.) 2 Sheets—Sheet 1.

F. A. MAGEE.
COOKING STOVE OR RANGE.

No. 344,845. Patented July 6, 1886.

WITNESSES.
W. P. Clough.
H. W. Stearns

INVENTOR.
Frank A. Magee
pr Norman W. Stearns
Atty (No Model.)
F. A. MAGEE.
COOKING STOVE OR RANGE.
No. 344,845. Patented July 6, 1886.
Fig. 3.
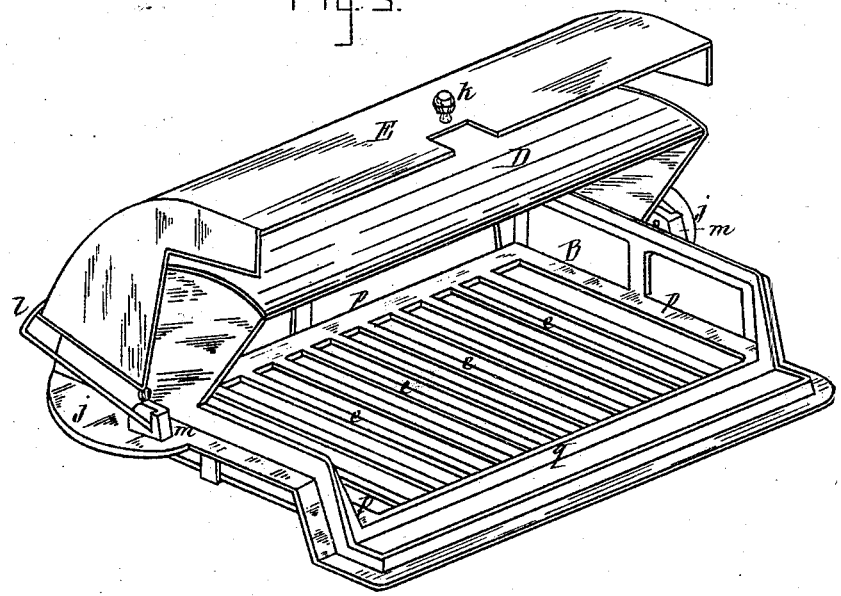
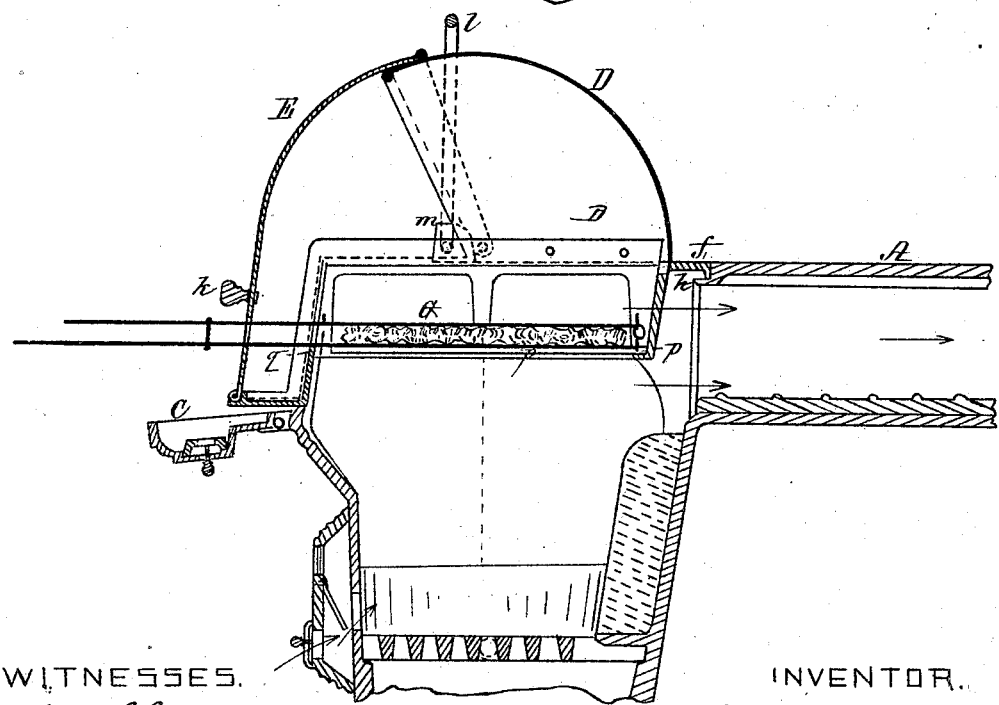
Fig. 4.
WITNESSES.
W. P. Clough
H. W. Stearns
INVENTOR.
Frank A. Magee,
pr Norman W. Stearns
Atty.

UNITED STATES PATENT OFFICE.

FRANK A. MAGEE, OF CHELSEA, MASSACHUSETTS, ASSIGNOR TO THE MAGEE FURNACE COMPANY.

COOKING STOVE OR RANGE.

SPECIFICATION forming part of Letters Patent No. 344,845, dated July 6, 1886.

Application filed July 29, 1885. Serial No. 172,992. (No model.)

*To all whom it may concern:*

Figure 1:
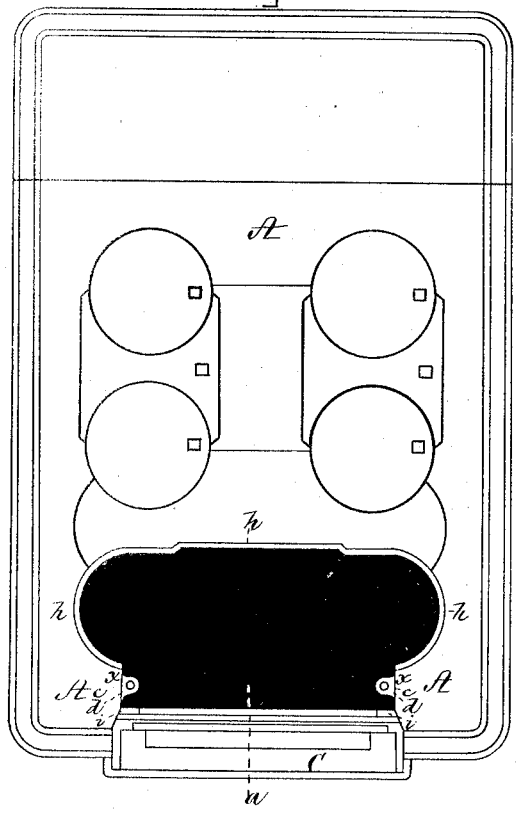
Figure 2:
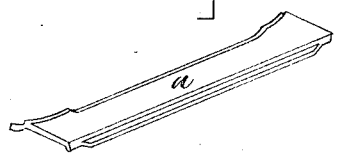
Figure 6:
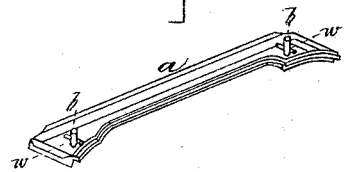
Figure 5:
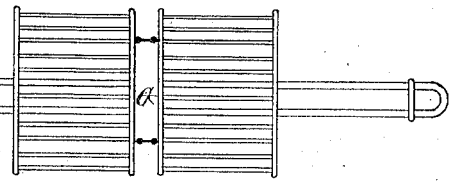

Be it known that I, FRANK A. MAGEE, of Chelsea, in the county of Suffolk and State of Massachusetts, have invented certain Improvements in Cooking Stoves or Ranges, of which the following is a full, clear, and exact description, reference being had to the accompanying drawings, making part of this specification, in which—
Figure 1 is a plan of the top plate of a stove with a portion of its front edge removed; Figs. 2 and 6, views of the said removable portion of the top plate, (detached.) Fig. 3 is a perspective view of a covered broiler, so constructed as to fit into the opening in the top plate over the fire when said front portion of the top plate is removed. Fig. 4 is a vertical central section through a stove, with the front edge of the top plate removed and a covered frame located in place over the fire, an independent reversible broiler being used in connection with said frame. Fig. 5 represents the said independent reversible broiler.

My present invention is an improvement in cooking stoves or ranges, my object being to afford additional facilities for broiling articles of food; and it consists in a top plate having its front edge made separate and capable of being removed therefrom, in combination with and for the temporary reception of a covered broiler, whereby the heat of the fire is retained around the article being cooked, and the fumes and odors thereof are prevented from escaping into the room.
To enable others skilled in the art to understand and use my invention, I will proceed to describe the manner in which I have carried it out.

In the said drawings, A represents the top plate of a cooking-stove, which is of the ordinary form and construction, except in this particular—viz., the front edge, $a$, of the top plate from $x$ to $x$, instead of being cast integral with the plate A, is made separately, Fig. 2, and adapted to be readily removed therefrom, in order that a portable covered broiler, B, Fig. 3, or broiler-frame, Fig. 4, may be located in the opening over the fire and at a slight distance therefrom when the ordinary covering-plates are removed, the upper front draft-plate, C, being swung down on its hinges into a horizontal or nearly a horizontal position, and the ends of the removable front edge, $a$, being preferably cut off at right angles to the direction of its length to admit of the introduction and fitting of the broiler snugly in place. On the under side of the ends of the removable front $a$ are teats $b\ b$, which drop into holes $c\ c$, passing through projections $d\ d$, extending out from the ends of the stationary portion of the front of the top plate, said projections serving as supports for the ends of the front edge, $a$, when located in place, and may be held there by pins $w\ w$, passing through holes in the teats, Fig. 6. Said broiler consists of a frame provided with transverse grooved bars $e$, and at its back a straight lip, $f$, which fits on and is supported by the straight portion of the ordinary flange, $h$, at the rear of the opening over the fire, the front of the broiler-frame resting on the two projections $d\ d$, which extend out into the space formed by the removal of the front edge, $a$, of the top plate, A. Each end $j$ of the frame is a segment of a circle, corresponding in size and curvature to a portion of the ordinary round covers of the pot-holes, and these segments fit upon and are supported by the curved portions of the flange $h$, which, with the straight portions of this flange, extend around the opening in the fire-pot. To the back of the broiler-frame, and around a portion of each side, is secured a stationary cap, D, and pivoted to the sides of the frame outside of the cap is a movable bonnet, E, which may be slid up or down, so as to open or close the entrance to the broiler, by applying the hand to the knob $k$. The greater portion of the rear and sides of the frame is left open, so that the passages formed thereby are located in line with the flues under the top plate of the stove, whereby when the broiler is closed the fumes and odors are carried away. The upper front draft-plate, C, catches over and is held in a closed position by two projections, $i\ i$, (at the front of the opening in the fire-pot,) when the broiler is not required for use.

$l$ is a bail or handle, by which the broiler may be placed in its position over the fire and lifted therefrom, the ends of the handle being pivoted in blocks m, which also serve as stops for keeping the handle from swinging down into contact with the hot top plate.

The bars e may be omitted and a separate and independent broiler employed in connection with the covered frame, if desired. For instance, an ordinary wire broiler, G, composed of two similar portions hinged together like that shown in Fig. 5, may be used, in which case it would be supported by the horizontal back and side strips, p, and vertical front q of the frame.

By using a wire or other broiler separate and independent from the frame the operation of broiling is rendered more satisfactory, as the article of food within the wire broiler may be turned more readily by simply reversing the broiler, whereas were the food placed on the bars e, made integral with the frame, the turning of the food with a fork would become necessary.

I claim—

A cooking stove or range having a top plate, A, consisting of a stationary portion with a flange, h, at its rear, and with projections d d and a removable portion, a, at its front, in combination with a removable broiler, B, consisting of a frame having a permanent cap, D, provided with a lip, f, at its rear and two segmental side portions, j j, and a movable bonnet, E, pivoted to the sides of the frame, as and for the purpose described.

Witness my hand this 24th day of July, 1885.

FRANK A. MAGEE.

In presence of—
N. W. STEARNS,
JAS. W. CHAPMAN.